(12) United States Patent
Kwak et al.

(10) Patent No.: US 8,151,967 B2
(45) Date of Patent: Apr. 10, 2012

(54) BANKNOTE STORAGE APPARATUS AND METHOD OF REMOVING BANKNOTES THEREFROM

(75) Inventors: Jae Hoon Kwak, Anyang-si (KR); Woo Ho Lee, Seoul (KR); Hee Chang Lee, Suwon-si (KR)

(73) Assignee: Nautilus Hyosung Inc., Seoul (KR)

( * ) Notice: Subject to any disclaimer, the term of this patent is extended or adjusted under 35 U.S.C. 154(b) by 142 days.

(21) Appl. No.: 12/647,800

(22) Filed: Dec. 28, 2009

(65) Prior Publication Data

US 2010/0168905 A1    Jul. 1, 2010

(30) Foreign Application Priority Data

Dec. 29, 2008 (KR) ........................ 10-2008-0135368

(51) Int. Cl.
*G07D 11/00* (2006.01)
(52) U.S. Cl. ........................................ 194/351; 194/350
(58) Field of Classification Search ................... 194/350, 194/351; 902/9, 10; 700/218; 271/163, 271/299; 221/97, 98, 154, 198; 235/379; 312/34.19, 50, 211, 212; 109/30, 31, 55
See application file for complete search history.

(56) References Cited

U.S. PATENT DOCUMENTS

2011/0125311 A1* 5/2011 Claghorn et al. ............. 700/213
* cited by examiner

*Primary Examiner* — Mark Beauchaine
(74) *Attorney, Agent, or Firm* — Fenwick & West LLP

(57) ABSTRACT

A banknote storage apparatus for easily removing banknotes stored therein includes a push bar, placed in an input port into which a banknote is inputted in a perpendicular direction, for providing stroke-operating toward a target storage part into which the banknote is determined to be stored; a driving motor for driving the stroke operation of the push bar; a pair of push plates for applying a pressure toward the input port in order to hold the banknotes perpendicularly stored according to the stroke operation of the push bar; and a detecting part for detecting an opening status of the door so that the driving motor is controlled to make the push bar move into a removing position for either one of the storage parts when detecting the opening status of the door.

4 Claims, 7 Drawing Sheets

BANKNOTE STORAGE APPARATUS AND METHOD OF REMOVING BANKNOTES THEREFROM

FIELD OF THE INVENTION

The present invention relates to a banknote storage apparatus for an automated teller machine, and more particularly, to a banknote storage apparatus and a method allowing easy removal of banknotes from storage boxes that stores the banknotes according to their kinds and sizes.

BACKGROUND OF THE INVENTION

A cash dispenser unit (CDU) and a bill recycling machine (BRM) have been developed for rapidly and conveniently providing most of the financial self-services other than counseling service irrespective of time. These cash dispenser unit and bill recycling machine are generally referred to as an automated teller machine (ATM).

Besides the common deposit/withdrawal functions, various function units are added to the ATM according to desiring financial services, such units as for processing a card, processing a bankbook, and depositing a check. It is usual that those deposited banknotes such as bills or checks, regardless of their kinds or sizes, are stored horizontally in a storage box of the ATM.

However, the ATM in which the deposited banknotes are stored horizontally has a problem in that the ATM should be enlarged in its size.

In addition, it may be necessary to sort the bills or checks and store them in separate parts respectively according to their kinds and sizes to facilitate management of the ATM. In the ATM, however, such a sorted and separated storage function has not been implemented, and so the management of the ATM should be limited.

Accordingly, a banknote storage apparatuses have been developed to be capable of sorting and storing bills or checks depending on their sizes or kinds in order to enable a compact size ATM and enhance the management's convenience thereof In the prior art storage apparatus of the ATM, when a deposited banknote is vertically introduced via an input port, a push bar is selectively stroke-operated toward a target one of separated storage boxes, depending on the kind and size of the banknote, so that the banknote can be vertically stored between the bush bar and a push plate of the target storage box. The push plate is usually pressed toward the push bar to hold the vertically stored banknote, and, therefore, the push plate should be reversed backward to make the banknote be easily and safely removed by a clerk. Such a configuration may cause inconvenience for removing the banknotes due to the pressure applied from the push plate.

SUMMARY OF THE INVENTION

In view of the above, the present invention provides a banknote storage apparatus and method for an automated teller machine, enabling banknotes stored in a storage box to be easily removed therefrom.

In accordance with an aspect of the present invention, there is provided a banknote storage apparatus for easily removing banknotes therefrom, the apparatus including: an input port into which a banknote is inputted in a perpendicular direction; storage parts arranged in a transverse direction with the input port centered therebetween and holding the currency perpendicularly; a push bar placed in the input port as being capable of stroke-operating toward a target storage part into which the banknote is determined to be stored; a driving motor for driving the stroke operation of the push bar; a pair of push plates for applying a pressure toward the input port in order to hold the banknotes perpendicularly stored according to the stroke operation of the push bar; a door installed at the storage parts; and a detecting part for detecting an opening status of the door so that the driving motor is controlled to make the push bar move into a removing position for either one of the storage parts when detecting the opening status of the door from the detecting part.

According to the present invention, the detecting part includes photo sensors and a prism for forming a light passage between the photo sensors, thereby detecting a closing status of the door when the light passage is connected, and the opening status when the light passage is disconnected.

Further, the apparatus further includes a push button part installed to selectively protrude or retract in response to the opening or closing operation of the door, a lever coupled with a hook member, wherein the lever can be uncoupled from the hook member by rotating with respect to a hinge shaft according to a pushing operation of the push button part, and a door lock unit having a cylinder member for maintaining the coupled connection between the lever and the hook member.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
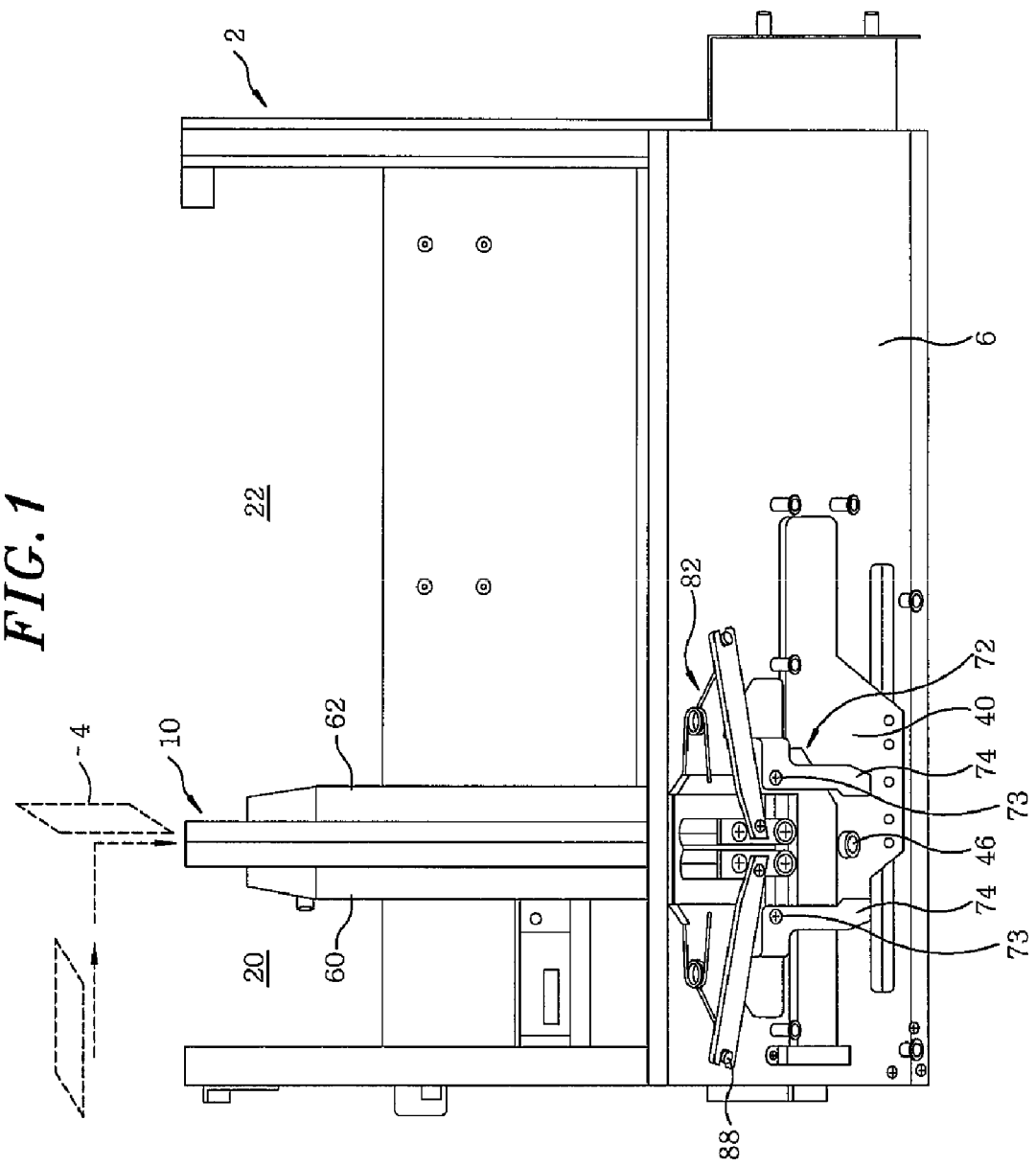
FIG. 1 is a schematic bottom perspective view of a banknote storage apparatus for an ATM in a standby mode in accordance with the present invention.
Figure 2:
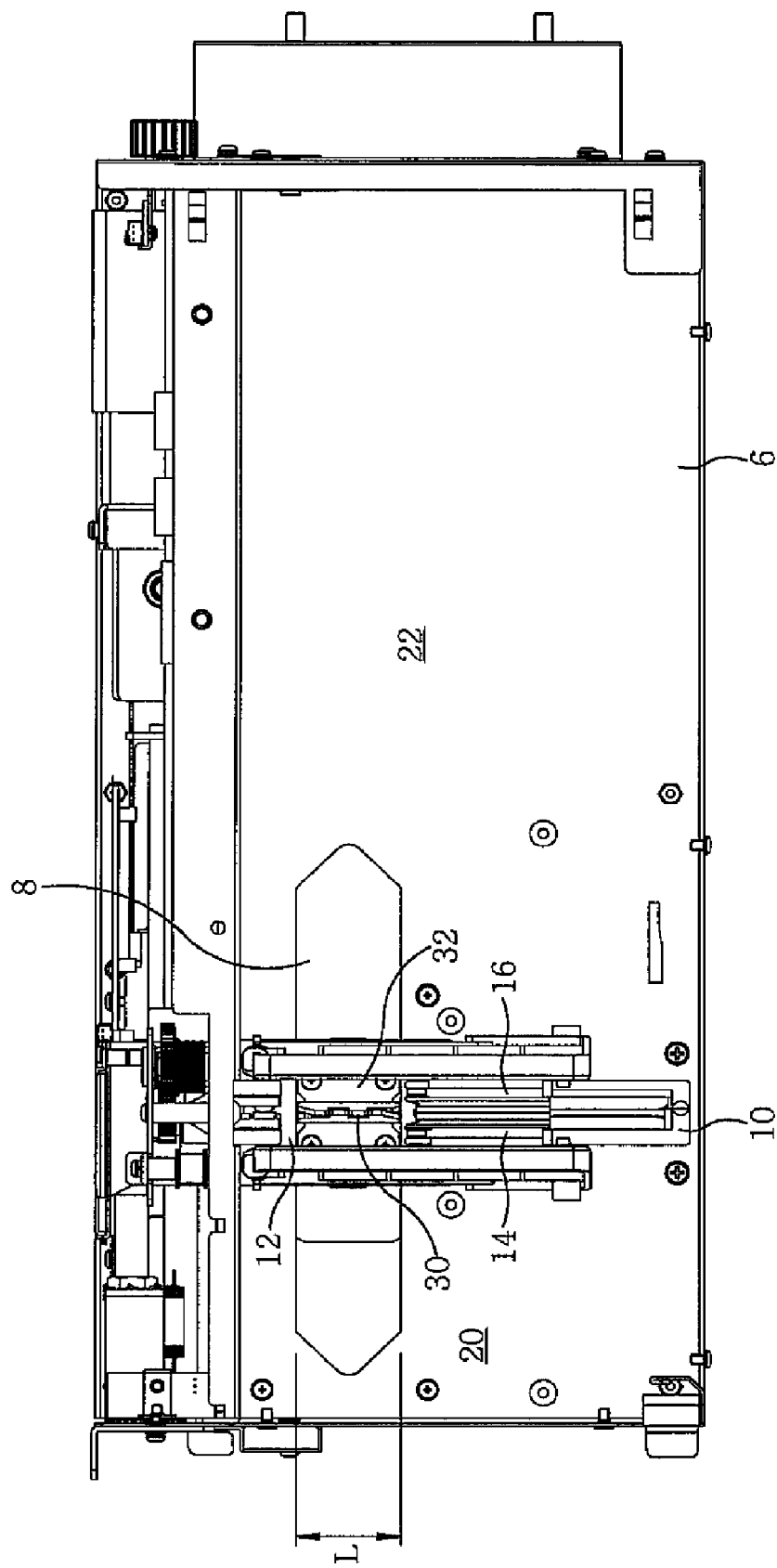
FIG. 2 is a plane view of the banknote storage apparatus for an ATM shown in FIG. 1.

FIG. 1 is a schematic bottom perspective view of a banknote storage apparatus for an automated teller machine (ATM) in a standby mode, wherein a front door thereof is omitted for the sake of convenience, in accordance with the present invention; FIG. 2 is a plane view of the banknote storage apparatus shown in FIG. 1; and FIG. 3 is a perspective view for illustrating a status for storing banknotes in the banknote storage apparatus.

Figure 3:
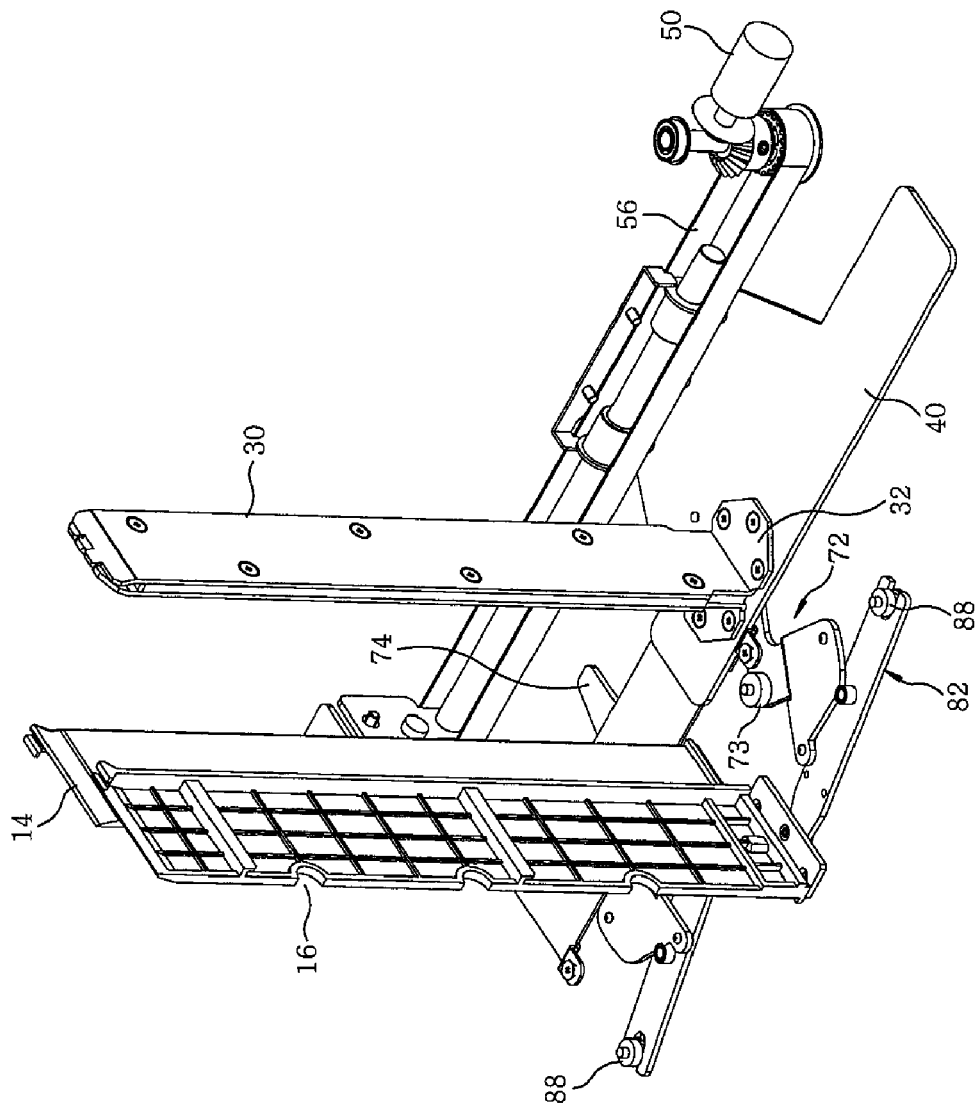
FIG. 3 is a perspective view for illustrating an operation of the banknote storage apparatus shown FIG. 1.

As shown in FIGS. 1 to 3, the banknote storage apparatus includes: an input port 10 into which a banknote to be deposited in the ATM is introduced in a perpendicular direction; first and second storage parts 20 and 22 arranged in a transverse direction with the input port 10 centered therebetween; a push bar 30 (FIGS. 2 and 3) such placed in the input port 10 as being capable of stroke-operating selectively toward a target storage part into which the banknote shall be stored; a driving motor 50 (FIG. 3) for driving a sliding movement of a sliding member 40 so as to enable the stroke-operation of the push bar 30; a pair of push plates 60 and 62 for applying a pressure toward the input port 10 to hold banknotes perpendicularly stored according to the stroke-operation of the push bar 30.

The banknote storage apparatus includes a main body 2 having a rectangular parallelepiped box, wherein a guide groove 8 is formed on a bottom 6 thereof, and the input port 10 having an opening section 12 of a certain width L is perpendicular to a mid portion of the guide groove 8 so that the opening section 12 and the guide groove 8 are communicated with each other, as shown in FIG. 2. In addition, a flange part 32 attached to a lower portion of the push bar 30 is inserted in the guide groove 8, and the push bar 30 is such located in the opening section 12 as to stroke-operate in a transverse direction for closing the opening section 12 of the input port 12 in a standby state. The first and second storage parts 20 and 22 are separated in the transverse direction by the input port 10 fixedly provided inside the main body 2 in the perpendicular direction like a partition wall, wherein a banknote 4 (indicated by a dotted line in FIG. 1) introduced into the banknote storage apparatus is conveyed horizontally and inputted vertically into the input port 10 from an upper side of the input port 10. In addition, the pair of push plates 60 and 62 respectively placed at both sides of the input port 10 is such installed as being capable of transversely sliding away from the input port 10 according to a stroke-operation of the push bar 30 and then forcing a reversing pressure toward the input port 10.

In case of the banknote storage apparatus as shown in FIGS. 1 to 3, the banknote 4 is inputted via the input port 10 into a target storage part determined in advance in the perpendicular direction. For example, if the banknote 4 is determined to be stored in the second storage part 22, the banknote 4 introduced in the perpendicular direction through the input port 10 is placed in a portion of the opening section 12 of the input port 10 between the push bar 30 and the second storage part 22.

Subsequently, the driving motor 50 is driven to stroke-operate the push bar 30 toward the second storage 22, and thereby rotating a driving belt 56 forwardly or reversely. According to the rotation of the driving belt 56, the sliding member 40 is slid toward the second storage part 22, and a bearing protrusion 46 formed on a center of the sliding member 40 pushes a vertical portion 74 of a first rotating member 72. As a result, the first rotating member 72 is rotated in the counterclockwise direction with respect to a first hinge shaft 73, and a second rotating member 82 interlocked with the first rotating member 72 is rotated in the clockwise direction with respect to a second hinge shaft 88, thereby opening a pair of covering plates 14 and 16.

Since the covering plate 16 is retracted into the input port 10 due to interlocking with the stroke-operation of the push bar 30 toward the second storage part 22 as explained above, the banknote 4 having passed through the opening section 12 of the input port 10 can be easily pushed into the second storage part 22 by the stroke-operation of the push bar 30 and thereby perpendicularly stored between the input port 10 and the push plate 62.

Figure 4:
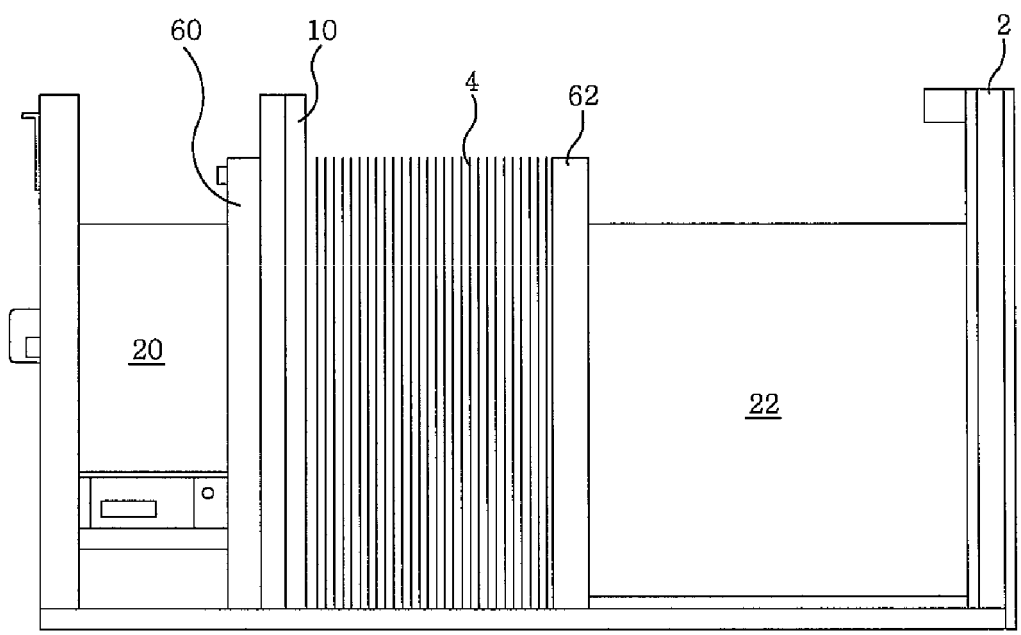
FIG. 4 is a schematic view illustrating a status in which a plurality of banknotes are stored in either one of storage parts in the banknote storage apparatus shown FIG. 1.

When a plurality of banknotes 4 are determined to be stored in the second storage part 22 according to the aforementioned configuration, the banknotes 4 are stored between the input port 10 and the push plate 62 as shown in FIG. 4.

Figure 5:
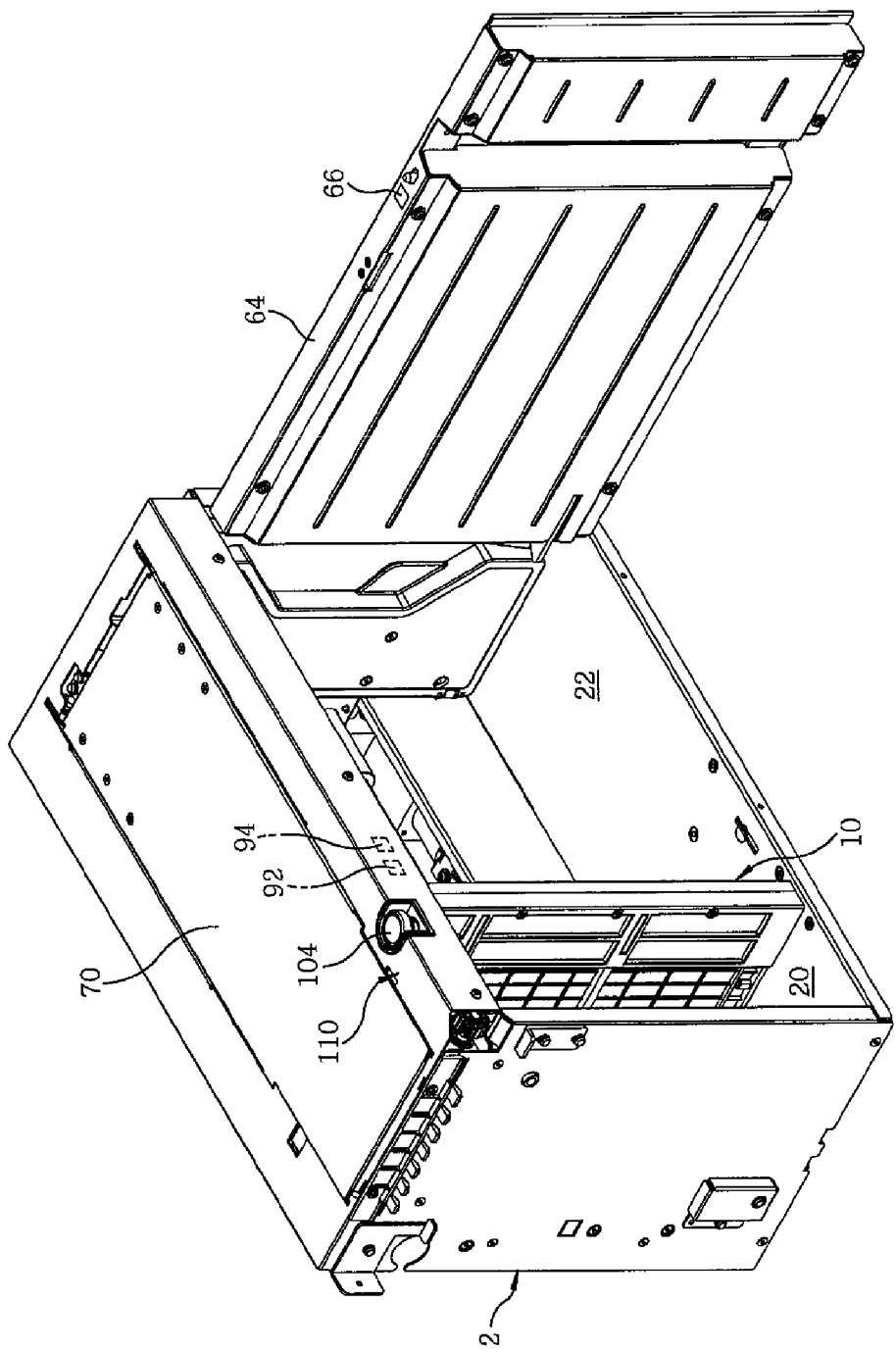
FIG. 5 is a perspective view for illustrating a configuration of detecting a door opening status of the banknote storage apparatus shown in FIG. 1.
Figure 6:
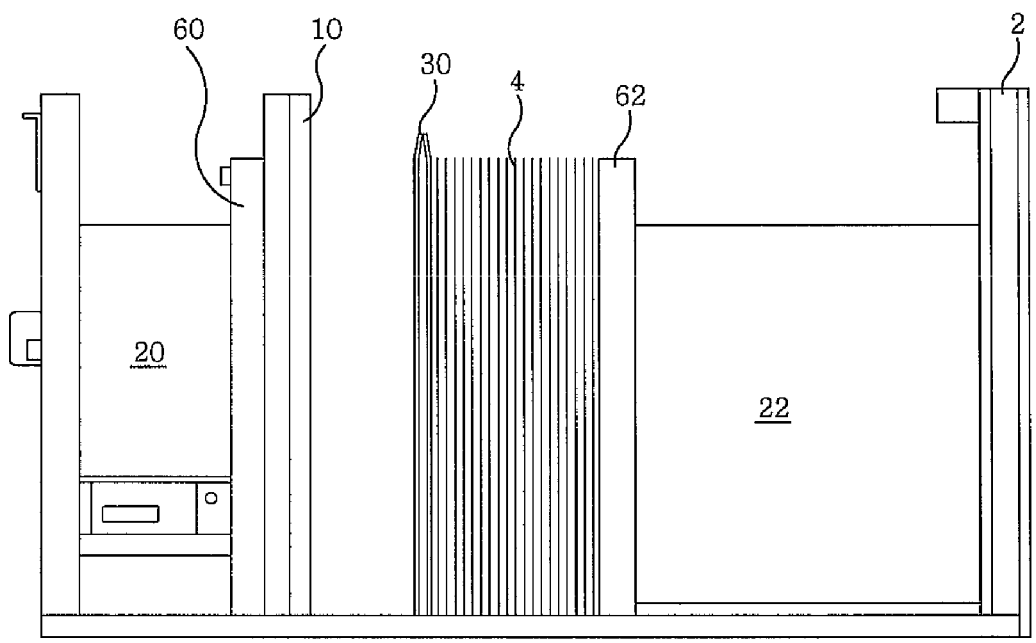
FIG. 6 is a schematic view for illustrating a status in which a push bar is moved into a removing position in response to a door opening operation of the banknote storage apparatus shown in FIG. 1.

In order for a clerk to easily remove the banknotes stored in the storage parts 20 and 22 of the aforementioned configuration, the banknote storage apparatus further includes a detecting part for detecting an opening status of a door 64 installed to selectively open or close the storage parts 20 and 22. As shown in FIG. 5, the detecting part includes a prism 66 located at the door 64, and photo sensors 92 and 94. The photo sensors 92 and 94 are installed on an upper frame of the main body 2 in a line. When the door 64 is closed, the prism 66 is directly located below the first photo sensor 92 to refract a light from the first photo sensor 92 toward the second photo sensor 94. Accordingly, a light path between the photo sensors 92 and 94 is successfully connected via the prism 66 and an ON or a light signal is transmitted to indicate the close state of the door 64. On the contrary, when the door 64 is opened, the light path is blocked between the photo sensors 92 and 94 and an OFF or a dark signal is transmitted to start the driving motor 50, such that the push bar 30 moves to thrust the banknotes 4 against the push plate 62 as shown in FIG. 6, thereby making it easy for the clerk to remove the banknotes 4 condensed at a removing position by the thrust. The removing position may be preferably set to enable the easy removing work of the clerk.

The banknote storage apparatus in accordance with the present invention further includes: a push button part 110 installed to selectively protrude or retract in response to opening or closing operation of the storage part door 64; a lever 130 coupled with a hook member 120, wherein the lever 130 can be uncoupled from the hook member 120 by rotating with respect to a hinge shaft 136 according to a pushing operation of the push button part 110; and a door lock unit 100 having a cylinder member 140 for maintaining the coupled connection between the lever 130 and the hook member 120.

Figure 7:
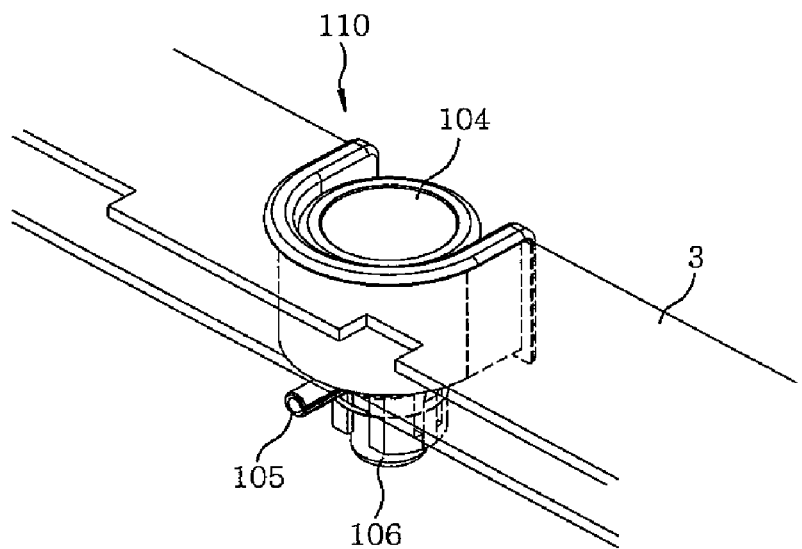
FIG. 7 is a detailed perspective view illustrating a push button part seen from an inside of the storage parts shown in FIG. 5.
Figure 8:
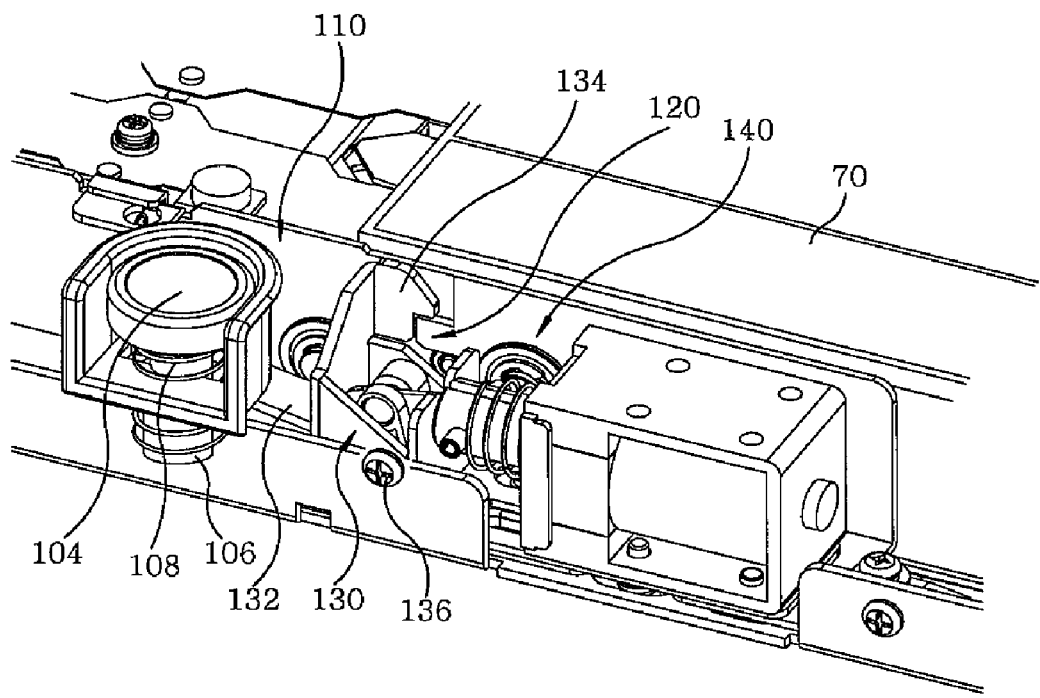
FIG. 8 is a detailed perspective view illustrating a door lock unit attached to an upper portion of the storage parts shown in FIG. 5.

As shown in FIG. 7, the push button part 110 includes: a button attached to an upper frame 3 of the main body 2; a protrusion 106 formed on a bottom portion of the button 104, wherein the protrusion 106 contacts an upper surface of the door 64 when the door 64 is closed but moves downward due to push operation of the button 104 when the door 64 is opened; and an elastic spring 108 (FIG. 8) inserted around the perimeter of the protrusion 106 so as to maintain an upward position of the protrusion 106, wherein a pin 105 capable of moving down in response to the downward movement of the protrusion 106 is provided for the spring 108. When the door 64 is closed, the protrusion 106 contacts the upper surface of the door 64 and, therefore, cannot move downward though if the button 104 is pushed down. When the door is opened, the protrusion 106 moves downward as the button 104 is pushed down, so that the pin 105 of the spring 108 can push a rod 132 of the lever 130 placed below. As a result, a bracket 134 of the lever 130, which is coupled with the hook member 120 attached to a side of a covering plate 70 of a lost banknote storage box for storing banknotes not taken away by a user, is rotated in a counterclockwise direction with respect to its hinge shaft 136, thereby uncoupling the connection of the lever 130 such that the covering plate 70 can be opened, as shown in FIG. 8.

As explained above, according to the removing apparatus and method of the ATM of the present invention, the push bar 30 is selectively moved into a preset removing position for either one of the storage parts 20 or 22 while simultaneously thrusting the stored banknotes, in response to the opening operation of the door 64 installed at the storage parts 20 and 22. Therefore, it is easy for the clerk to remove the banknote, and further the lost banknote storage box cannot be opened without the opening operation of the door 64 in advance, thereby enabling a simple and reliable opening operation of the storage boxes.

While the invention has been shown and described with respect to the preferred embodiments, it will be understood by those skilled in the art that various changes and modifications may be made without departing from the scope of the invention as defined in the following claims.

What is claimed is:

1. A banknote storage apparatus for easily removing banknotes therefrom, the apparatus comprising:
    an input port into which a banknote is inputted in a direction perpendicular to a bottom of the banknote storage apparatus;
    first and second storage parts arranged in a transverse direction with the input port centered therebetween and holding the currency perpendicularly to the bottom of the banknote storage apparatus;
    a push bar placed in the input port as being capable of stroke-operating toward a target storage part into which the banknote is determined to be stored;
    a driving motor for driving the stroke operation of the push bar;
    a pair of push plates for applying a pressure toward the input port in order to hold the banknotes stored perpendicularly to the bottom of the banknote apparatus according to the stroke operation of the push bar;
    a door installed at the storage parts; and
    a detecting part for detecting an opening status of the door so that the driving motor is controlled to make the push bar move into a removing position for either one of the storage parts when detecting the opening status of the door from the detecting part.

2. The apparatus of claim 1, wherein the detecting part includes photo sensors and a prism for forming a light passage between the photo sensors, thereby detecting a closing status of the door when the light passage is connected, and the opening status when the light passage is disconnected.

3. The apparatus of claim 1, further comprising:
    a push button part installed to selectively protrude or retract in response to the opening or closing operation of the door;
    a lever coupled with a hook member, wherein the lever can be uncoupled from the hook member by rotating with respect to a hinge shaft according to a pushing operation of the push button part; and
    a door lock unit having a cylinder member for maintaining the coupled connection between the lever and the hook member.

4. A method for removing banknotes stored in a banknote storage apparatus, wherein the banknote storage apparatus includes an input port into which a banknote is inputted in a perpendicular direction to a bottom of the banknote storage apparatus; storage parts arranged in a transverse direction with the input port centered therebetween and holding the currency perpendicularly; a push bar placed in the input port as being capable of stroke-operating toward a target storage part into which the banknote is determined to be stored; a driving motor for driving the stroke operation of the push bar; a door installed at the storage parts; and a detecting part for detecting an opening status of the door, the method comprising:
    detecting a door opening status by the detecting part;
    driving the driving motor when the door opening status is detected;
    moving the push bar into a removing position having a preset gap between the input port and the push bar according to the driving of the driving motor; and
    moving banknotes stored in either of the storage parts according to the movement of the push bar, whereby the preset gap of the removing position is formed to enable an easy removal of the banknotes.

* * * * *